J. S. & T. B. ATTERBURY & J. REDDICK.
GLASS MOLD.
No. 34,345. Patented Feb. 11, 1862.
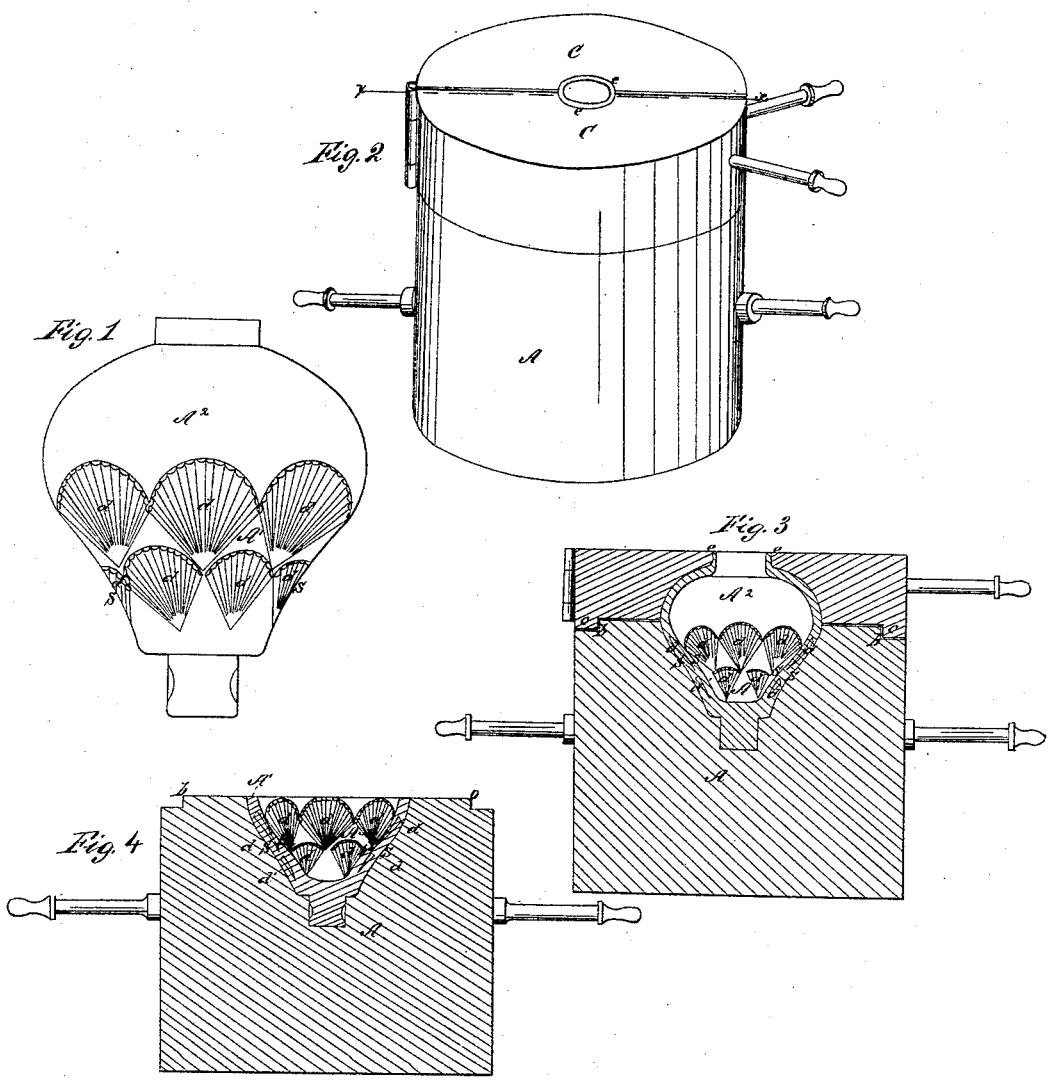
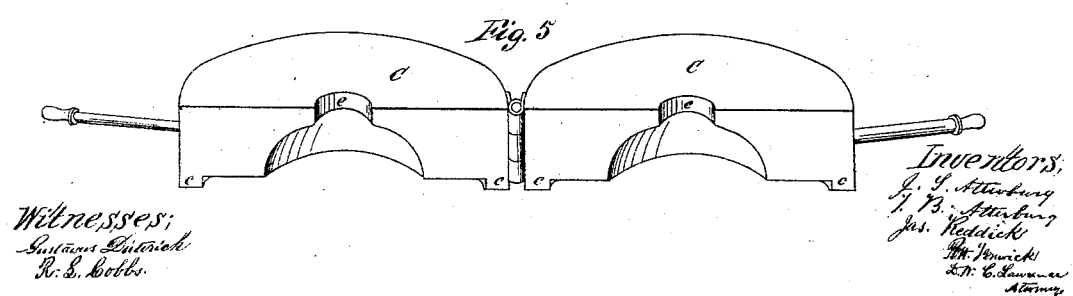

UNITED STATES PATENT OFFICE.

J. S. ATTERBURY, T. B. ATTERBURY, AND JAMES REDDICK, OF PITTSBURG, PENNSYLVANIA.

IMPROVEMENT IN THE MANUFACTURE OF HOLLOW GLASSWARE.

Specification forming part of Letters Patent No. 34,345, dated February 11, 1862.

*To all whom it may concern:*

Be it known that we, J. S. ATTERBURY, T. B. ATTERBURY, and JAMES REDDICK, all of Pittsburg, in the county of Allegheny and State of Pennsylvania, have invented a new and useful Improvement in the Process of Manufacturing Hollow Glassware; and we do hereby declare that the following is a full, clear, and exact description of the same, reference being had to the accompanying drawings, forming part of this specification, in which—

Figure 1 is a side elevation of a lamp "peg" or bowl manufactured according to our invention. Fig. 2 is a perspective view of a mold which we use in the manufacture of the improved hollow glassware. Fig. 3 is a vertical section of the mold with a lamp peg or bowl molded and blown in it. Fig. 4 is a section of the lower portion of the mold. Fig. 5 is an inside view of the upper portion of the mold.

Similar letters of reference in each of the several figures indicate corresponding parts.

The nature of our invention consists in the manufacture of lamp pegs or bowls and various descriptions of hollow glassware, with ornamental designs or figures intermediate between inner and outer plain surfaces of the glass of which the articles are composed. The manufacture of hollow glassware in this manner is very important, as both the inner and outer surfaces thereof are plain and smooth, and no chance exists for dirt to fill in the ornaments, nor of the fluid in the vessels destroying the effect of the ornaments upon the eye, and therefore articles which are more ornamental and less difficult to clean are produced, and that, too, at less expense than the common articles which are manufactured with ornaments exposed to the fluid and dirt.

The objections to articles which have the ornamental designs either on the outer or inner surface of the glass are these: When the figures or designs are on the inner surface of the glass, the oil or other liquid comes in contact with the design and obscures it to such an extent that very little reflection or appearance of ornaments is perceptible to the eye, and when the ornaments are on the outer surface of the glass articles dirt collects upon them and destroys their beauty, as well as increases the labor of cleaning them.

To enable others skilled in the art to practice our invention, we will proceed to describe the method of performing it.

To make a lamp bowl or peg, Fig. 1, the plain lower section A of the mold is brought into use. This section is made of metal or other suitable material, and is in form of the lower major portion A' of the lamp peg or bowl. Melted glass is poured into said lower section, and a plunger corresponding in form to section A and having the desired ornamental design $d$ cut upon its circumference is then forced down upon the glass, so as to give the general form to the lower major portion of the lamp peg or bowl, and also to impress the design $d$ upon the inner surface of the glass. Thus far the process is the same as that commonly practiced in the manufacture of hollow glassware.

In the next step of the process the upper section C C' of a mold corresponding in form with the desired upper minor portion $A^2$ of the lamp peg or bowl is brought into use by being placed on top of the lower section A. This section of the mold is also made of metal and in two halves, which are hinged together, as shown, there being a central round hole $e$ in the top. The upper and lower sections of the mold are fitted snugly together by means of a shoulder $b$ and flange $c$. The blower then gathers up some glass and brings it to a proper shape for the purpose intended by blowing gently. This glass he properly adjusts, in a solid state to the interior of the mold by opening the upper section of the mold. All being ready the upper section is again closed and the blower blows through the pipe which enters the hole in the center of the top section, and thereby causes the glass last introduced to fuse and coat the inner impressed surface of the major portion of the lamp peg or bowl and thus completely cover the ornamental design $d$ thereon, so as to leave the design between inner and outer plain glass surfaces $s\ s$. The impressed surface being thus coated, the blower continues the blowing process until the top or minor portion of the lamp bowl or peg is blown upon the lower or major portion, and thus the lamp is produced by a combination of the molding and blowing processes.

Instead of using the top section of the mold to blow the upper minor portion of the lamp bowl or peg, the blower may, after the lower major portion is molded and the design impressed upon it, gather up some glass on the end of his blow-pipe and adjust the same over the said portion of the lamp bowl or peg and blow the coating of glass over the ornamental design, and then take the major portion of the lamp bowl or peg out of the mold and finish upon it the upper minor portion in the old way—to wit, by warming the upper flaring edge in the fire and manipulating the glass with "shears" or proper tools until the upper part of the lamp-bowl is shaped and finished. This method produces the same result—viz., the manufacture of hollow glass articles with the ornamental designs between inner and outer plain glass surfaces; but it is not as expeditious and cheap as the method in which the upper section of the mold is used.

In this connection we will remark that the use of one portion of the mold for pressing and the other portion for blowing one and the same article in is a novelty in the art of glass manufacture, whether the design or ornaments be impressed on the outside or inside of hollow glassware, and whether the ornaments be coated or left exposed, the combination of the blowing and pressing or molding processes in this manner enabling us to make the articles in glass much cheaper than heretofore.

In the manufacture of open flaring-mouthed articles—such as tumblers—the same process may be followed in the coating over of the ornaments; but these articles must be warmed over the fire and their mouths flared and finished in the old way.

As it is obvious that this process of ornamenting may be extended to all articles of hollow glassware which combine in their production the molding and blowing processes, and also to various glass articles which obtain their general form in the mold and are then accurately shaped and finished by hand manipulations, we do not confine ourselves to lamps and tumblers as herein named.

What we claim as our invention, and desire to secure by Letters Patent, is—

1. The manufacture of lamp pegs or bowls and other descriptions of hollow glassware, with the ornamental designs or figures intermediate the inner and outer plain surfaces of the glass of which the articles are composed, substantially in the manner described.

2. While not claiming the plan of a mold made with a lower section and two upper sections hinged together and to the lower section, we do claim the performance within a sectional mold, such as we have shown, of the pressing and blowing processes successively in the production of one and the same hollow article of glassware, substantially as and for the purposes set forth.

J. S. ATTERBURY.
      T. B. ATTERBURY
      JAS. REDDICK.

Witnesses:
 A. B. STEVENSON,
 ANDREW DORSEY.